United States Patent
Lipo et al.

(10) Patent No.: US 6,710,495 B2
(45) Date of Patent: Mar. 23, 2004

(54) MULTI-PHASE ELECTRIC MOTOR WITH THIRD HARMONIC CURRENT INJECTION

(75) Inventors: Thomas A. Lipo, Middleton, WI (US); Renato O.C. Lyra, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/969,527

(22) Filed: Oct. 1, 2001

(65) Prior Publication Data

US 2003/0085627 A1 May 8, 2003

(51) Int. Cl.$^7$ ................................................ H02K 1/00
(52) U.S. Cl. ........................ 310/184; 318/809; 318/771
(58) Field of Search ................................ 318/254, 496, 318/503, 727, 801, 807–809; 310/179, 180, 184, 185, 188

(56) References Cited

U.S. PATENT DOCUMENTS

| | | | |
|---|---|---|---|
| 3,584,278 A | | 6/1971 | Krabbe ........................ 318/777 |
| 4,039,910 A | | 8/1977 | Chirgwin ..................... 318/807 |
| 4,409,507 A | | 10/1983 | Godwin ....................... 310/205 |
| 4,503,377 A | | 3/1985 | Kitabayashi et al. ........ 318/807 |
| 4,562,397 A | | 12/1985 | Kitabayashi et al. ........ 318/814 |
| 4,999,561 A | | 3/1991 | Kaga et al. ................. 318/812 |
| 5,051,639 A | | 9/1991 | Satake et al. ............... 310/112 |
| 5,053,689 A | * | 10/1991 | Woodson et al. ............ 318/705 |
| 5,130,591 A | | 7/1992 | Sato ........................... 310/172 |
| 5,499,178 A | * | 3/1996 | Mohan ......................... 363/39 |
| 5,559,385 A | * | 9/1996 | Yalovega et al. ............ 310/198 |
| 5,777,459 A | | 7/1998 | Bansal et al. ................. 322/47 |
| 5,880,550 A | | 3/1999 | Fukao et al. ................. 310/179 |
| 6,051,898 A | * | 4/2000 | Sakamoto ................. 310/49 R |
| 6,054,837 A | | 4/2000 | Edelson ....................... 318/801 |
| 6,142,131 A | | 11/2000 | Wortman et al. ............... 124/3 |
| 6,242,884 B1 | | 6/2001 | Lipo et al. ................... 318/308 |
| 6,359,415 B1 | * | 3/2002 | Suzuki et al. ................ 318/727 |

FOREIGN PATENT DOCUMENTS

JP          04127893 A   *  4/1992   ........... H02P/5/408

OTHER PUBLICATIONS

P.L. Alger, et al., "Double Windings for Turbine Alternators," AIEE Transactions, vol. 49, Jan. 1930, pp. 226–244.

P.W. Franklin, "A Theoretical Study of the Three Phase Sallent Pole Type Generator with Simultaneous AC and Bridge Rectified DC Output," IEEE Transactions on Power App. and Systems, vol. PAS–92, No. 2, Mar./Apr. 1973, pp. 543–557.

J.R. Fu, et al., "Disturbance–Free Operation of a Multiphase Current–Regulated Motor Drive with an Opened Phase," IEEE Transactions on Industry Applications, vol. 30, No. 5, Sep./Oct. 1994, pp. 1267–1274.

J.C. Salmon, et al., "A Split–Wound Induction Motor Design to Improve the Reliability of PWM Inverter Drives," IEEE Transactions on Industry Applications, vol. IA–26, No. 1, Jan./Feb. 1990, pp. 143–150.

(List continued on next page.)

Primary Examiner—Karl Tamai
Assistant Examiner—Judson H. Jones
(74) Attorney, Agent, or Firm—Foley & Lardner

(57) ABSTRACT

Significantly increased torque is provided from a motor having a stator with a core and at least two three-phase windings wound on the core. The two windings are separated spatially by 30 electrical degrees. Power is provided to the two windings by two power supplies which each provide power at the same fundamental frequency and with a component at the third harmonic of the fundamental, with the power provided from one power supply shifted in time by 30° of the fundamental frequency with respect to the power provided by the other power supply. The additional third harmonic component reduces the effective peak flux density, allowing an increase in the fundamental component of flux to allow an increase in effective torque, with the third harmonic component also providing additional torque.

34 Claims, 11 Drawing Sheets

OTHER PUBLICATIONS

E.F. Fuchs, et al., "Analysis of an Alternator with Two Displaced Stator Windings," IEEE Transactions on Power App. and Systems, vol. PAS–93, No. 6, Nov./Dec. 1974, pp. 1776–1786.

T.A. Lipo, "A d–q Model for Six Phase Induction Machines," International Conference on Electric Machines, Athens, Greece, 1980, pp. 860–867, month unknown.

T.J. Jahns, "Improve Reliability in Solid–State AC Drives by Means of Multiple Independent Phase–Drive Units," IEEE Transactions on Industry Applications, vol. IA–16, No. 3, May/Jun. 1980, pp. 321–331.

Alfredo Muńoz–Garcia, et al., "Dual Stator Winding Induction Machine Drive," IEEE Transaction on Industry Applications, vol. 36, Sep., 2000, pp. 1369–1379.

* cited by examiner

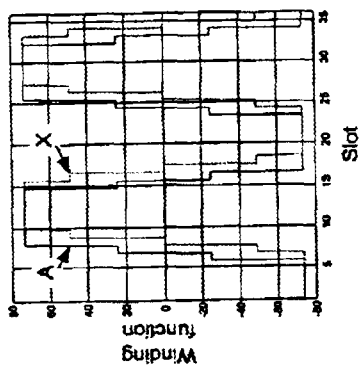
Fig. 6
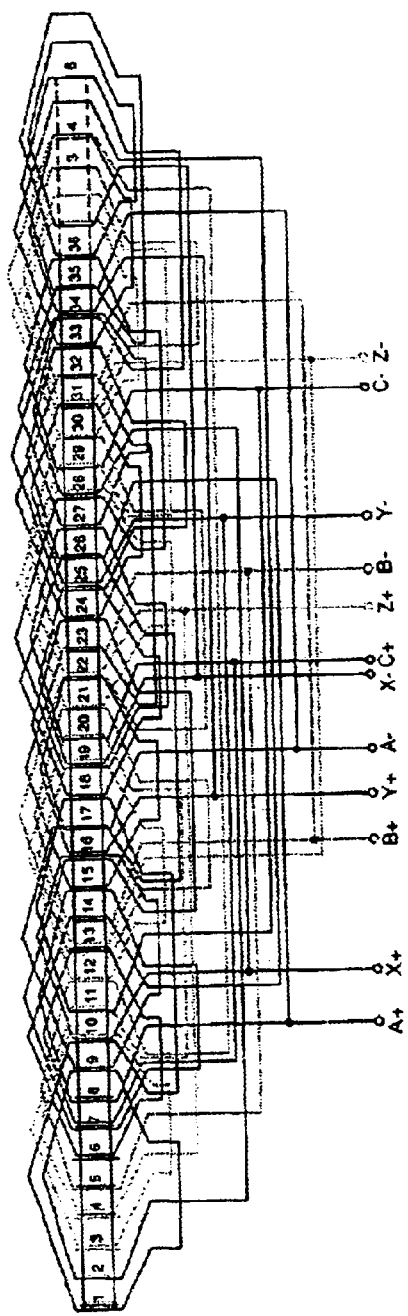
Fig. 4
Fig. 5

MULTI-PHASE ELECTRIC MOTOR WITH THIRD HARMONIC CURRENT INJECTION

FIELD OF THE INVENTION

This invention pertains generally to the field of electric motors and to power conversion systems for driving electric motors.

BACKGROUND OF THE INVENTION

Three-phase induction machines are presently a standard for industrial electrical drives. Relatively low cost, high reliability, robustness and maintenance-free operation are among the reasons three-phase induction machines are replacing DC drive systems. The development of power electronics and signal processing systems has eliminated what had been one of the greatest disadvantages of such AC systems, that is, the issue of control. With modern techniques of field oriented vector control, variable speed control of induction machines is readily achievable.

The need to increase system performance, particularly when placing limits on the power ratings of power supplies and semiconductors, motivates the use of a phase number other than three, and increases the need for new pulse width modulation (PWM) techniques, new machine design criteria, and the use of harmonic current and flux components.

In a multi-phase system, here assumed to be a system that comprises more than the conventional three phases, the machine output power can be divided into two or more solid state inverters that can each be kept within prescribed power limits. In addition, having additional phases means that additional degrees of freedom are available for further improvements in the drive system.

With split-phase induction machines, and an appropriate drive system, the sixth harmonic torque pulsation, typical in a six-step three-phase drive, can be eliminated. See, A. R. Bakhshai, et. al., "Space Vector PWM control of a split-phase induction machine using the vector classification technique," Proc. of Applied Power Electronics Conf. and Exposition, 1998, Vol. 2, February 1998, pp. 802–808; R. H. Nelson, et al., "Induction machine analysis for arbitrary displacement between multiple windings," IEEE Trans. on Power Apparatus and Systems, Vol. 93, May 1974, pp. 841–848. In addition, air gap flux created by fifth and seventh harmonic currents in a high power six-step converter-fed system is dramatically reduced, with a penalty of increased converter harmonic currents. See, L. U. Xu et al., "Analysis of a novel stator winding structure minimizing harmonic current and torque ripple for dual six-step converter-fed high power AC machines," IEEE Trans. on Industry Applications, Vol. 31, January 1995, pp. 84–90. PWM techniques are employed to overcome this problem by eliminating the harmonic current in the modulation process when the power ratings are not prohibitive.

Dual-stator machines are similar to split-phase machines, with the difference that the stator groups are not necessarily equal. A dual-stator machine with different numbers of poles in each three-phase group has been developed to obtain controllability at low speeds. A. R. Munoz, et al., "Dual-stator winding induction machine drive," IEEE Trans. on Industry Applications, Vol. 36, September 2000, pp. 1369–1379, and U.S. Pat. No. 6,242,884, entitled Dual Stator Winding Induction Machine Drive. Two independent stator windings have also been used for an induction generator system, as described in O. Ojo, et al., "PWM-VSI inverter-assisted stand-alone dual-stator winding induction generator," IEEE Trans. on Industry Applications, Vol. 36, November 2000, pp. 1604–1611. In this system, one set of windings is responsible for the electromechanical power conversion while the second set is used for excitation purposes. A PWM converter is connected to the excitation windings and the load is connected directly to the power windings.

A six-phase machine, a particular case of a split-phase or dual-stator machine, can be built by splitting a three-phase winding into two groups. Usually these three-phase groups are displaced by thirty electrical degrees from each other. This arrangement provides an asymmetrical six-phase machine because the angular distance between phases is not all the same. See, G. Oriti, et al., "An inverter/motor drive with common mode voltage elimination," Thirty-Second IAS Annual Meeting, IAS' 1997, Vol. 1, October 1997, pp. 587–592. The analysis of an induction machine for multiple phases and arbitrary displacement between them is presented in R. H. Nelson, et al., supra, where a six-phase induction machine is used as an example and an equivalent circuit has been derived. The dqO model for a six-phase machine is described in T. A. Lipo, "A space d-q model for six-phase induction machines," Proc. Of the International Conference on Electrical Machines, Athens, September 1980, pp. 860–867.

Reliability is one of the advantages of a six-phase system. If one of the phases fails—either in the machine or in the power converter—the system can still operate on a lower power rating since each three-phase group can be made independent of the other. If one phase is lost, the six-phase machine can continue to be operated as a five-phase machine, for example, as described in J. Fu, et. al., "Disturbance free operation of a multi-phase current regulated motor drive with an open phase," IEEE Trans. on Industry Applications, Vol. 30 September 1994, pp. 1267–1274.

The inherent third harmonic component in the winding functions of such machines indicates the possibility of using third harmonic currents to improve performance. H. A. Toliyat, et al., "Analysis of a concentrated winding induction machine for adjustable speed drive applications. I. Motor Analysis," IEEE Trans. on Energy Conversion, Vol. 6, December 1991, pp. 679–683; H. A. Toliyat, et al., "Analysis of a concentrated winding induction machine for adjustable speed drive applications. II. Motor design and performance," IEEE Trans. on Energy Conversion, Vol. 6, December 1991, pp. 684–692. Torque improvement can be obtained by using multi-phase windings with injection of third harmonic currents. A nine-phase induction machine with third harmonic injection has been investigated. S. S. P. Liou, "Theoretical and experimental study of poly-phase induction motors with added third harmonic excitation," Masters Thesis, University of Texas at Austin, 1985. The complexity of the power system, which includes series and parallel transformers, increases the system costs and requires evaluation for particular applications. The use of a voltage-controlled system does not guarantee the phase alignment between fundamental and third harmonic currents, especially at low speeds, and a poor low speed and dynamic behavior can be expected for such a system.

SUMMARY OF THE INVENTION

In the present invention, a significant increase in torque may be provided from an induction motor in the motor drive system of the invention as compared to the torque provided by a conventional induction motor of the same physical dimensions and characteristics. Potential increases in torque output up to 40% may be obtained from a modified induction motor in accordance with the invention, utilizing conventional commercially available stator core and rotor constructions, with a modification of the winding of the electrical conductors on the stator. The modified induction motor is readily constructed in accordance with commercial motor manufacturing processes and requires minimal additional materials.

A preferred motor drive system in accordance with the invention includes a motor having a stator with a core and two three-phase windings wound on the core, with the two windings separated spatially by 30 electrical degrees. Each of the two windings has three terminals and a neutral terminal by which power may be applied to the windings. An induction machine rotor, such as a squirrel cage rotor, is mounted for rotation within the stator. A first power supply is connected to the terminals of a first of the stator windings and a second power supply is connected to the terminals of a second of the stator windings. The power supplies provide current to the two three-phase stator windings with the same fundamental frequency and with an additional component at the third harmonic of the fundamental frequencies. One of the power supplies provides current to one of the windings that is shifted in time by 30° (of the fundamental) with respect to the current provided by the other power supply. Shifting one winding with respect to the other spatially by 30 electrical degrees and providing current at the fundamental frequency to the two windings separated in time by 30° effectively allows the machine to operate with the same flux density distribution as a conventional three-phase machine having a single three-phase winding. The addition of the third harmonic component to the power supplied to the two windings effectively flattens the peak of the flux density distribution, allowing the fundamental component of the flux density to be increased until the composite air gap flux density reaches its prior peak level, thereby producing significantly enhanced torque. In addition, the third harmonic component itself contributes output torque. An increase of up to 40% in the torque production can be obtained as compared to a standard three-phase machine, for the same peak flux distribution. Alternatively, the tooth and core flux density may be constrained to fixed values, but the stator slot area and the amount of conductor wound in the slots increased to also allow a significant increase in torque production.

The power supplies for the motor drive system are preferably current controlled inverters, e.g., pulse width modulated current controlled inverters, which provide power to the two three-phase windings of the motor that is balanced in each of the two windings.

The present invention may also be implemented in a linear motor in which one or more stators with two three-phase windings are provided in a linear arrangement with a linear moving element (a "linear rotor") mounted for translational movement adjacent to the stator(s).

The invention may be extended to machines having more than six phases. For example, the motor drive system may include a machine having nine phases, composed of three three-phase windings, with each set of windings provided with power from a three-phase power supply such as an inverter. In this case, the three three-phase windings are shifted with respect to each other by 20 electrical degrees. Third harmonic currents may be provided by the power supplies as a three-phase set of third harmonics which are balanced and sum to zero, in which case a neutral return line to the power supplies is not needed. The invention may also be utilized with wound rotor induction and synchronous motors.

Further objects, features and advantages of the invention will be apparent from the following detailed description when taken in conjunction with the accompanying drawings.

BRIEF DESCRIPTION OF THE DRAWINGS

In the drawings:

FIG. 4 is a winding diagram for a six-phase machine in accordance with the invention wound on the same stator core as the machine of FIG. 3.

FIG. 5 are diagrams illustrating the winding arrangement of the coils in the slots of the machine of FIG. 4.

FIG. 6 are winding functions for phases A and X as a function of slot position for the machine of FIG. 4.

DETAILED DESCRIPTION OF THE INVENTION

Figure 1:
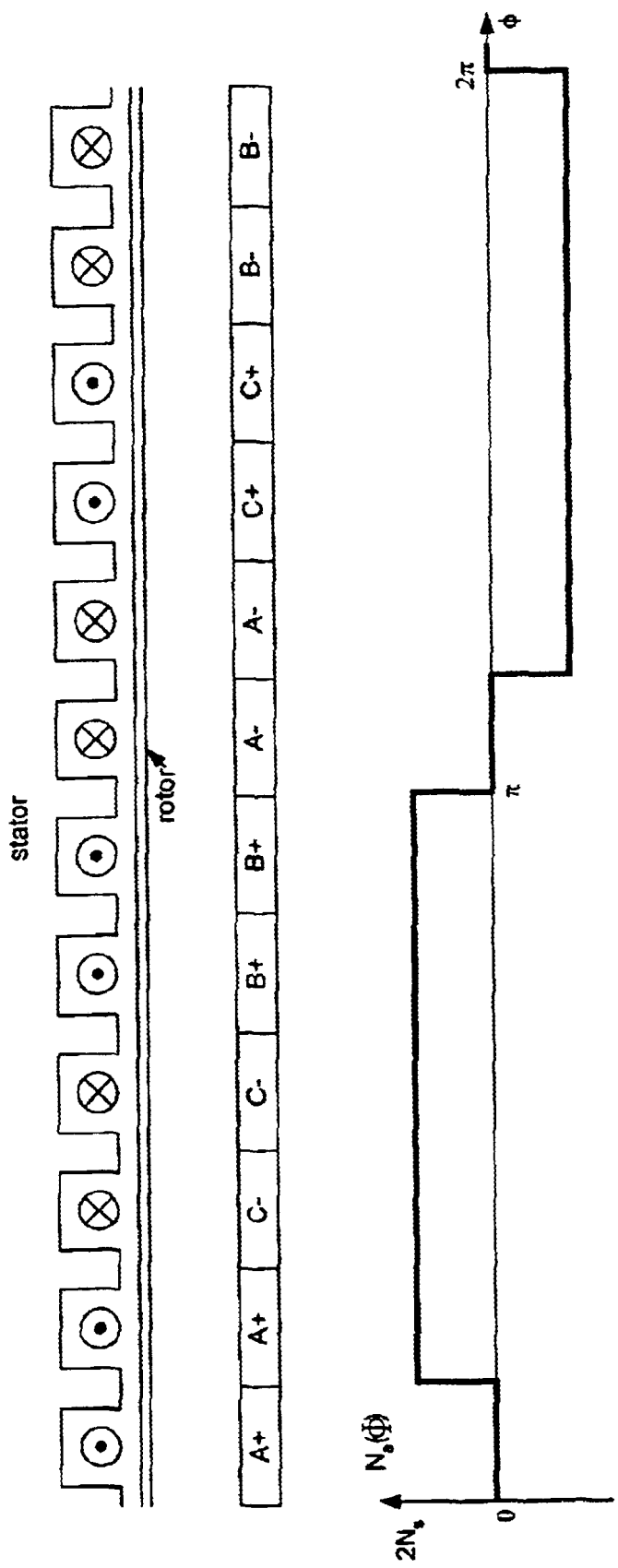
FIG. 1 is a diagram illustrating the spatially phase-shifted winding configuration for a machine having the windings distributed over two slots and with 30° spatial phase shift between windings.

In the present invention, injecting third harmonic, zero sequence current components in the phase currents provided to a six phase (dual three phase) machine significantly improves the machine torque density. Analytical results are first presented below to illustrate the system operation and to demonstrate the improvement in the torque density.

An analysis of an asymmetric six-phase machine that may be utilized in the invention can be carried out by beginning with consideration of a conventional three-phase induction machine. For a two pole concentrated winding three-phase machine, the mmf (magnetomotive force) acting across the air gap associated with the stator currents is:

$$F = F_a + F_b + F_c = N_a(\phi)i_a + N_b(\phi)i_b + N_c(\phi)i_c \quad (1)$$

where $N_a$, $N_b$, and $N_c$ are the machine's winding functions and compose a set of 120 degrees phase shifted square waves with amplitude $2N_s$ (each coil has $4N_s$ turns). Using Fourier analysis decomposition, and assuming balanced three-phase currents with amplitude I, it can be shown that the even and all triple harmonics are zero and the mmf is given by:

$$F = F_1 + F_5 + F_7 + \quad (2)$$

where $$F_1 = \left(\frac{34}{2\pi}\right)(2N_s)I[\sin(\phi - \theta)] \quad (3)$$

$$F_5 = \left(\frac{134}{52\pi}\right)(2N_s)I[\sin(5\phi - \theta)] \quad (4)$$

$$F_7 = \left(\frac{134}{72\pi}\right)(2N_s)I[\sin(7\phi - \theta)] \quad (5)$$

and the wave contains a 0% third harmonic, 20% fifth harmonic and 14% seventh harmonic, plus smaller portions of higher harmonics. Setting the sine function argument equal to a constant, to establish a fixed point in the waveform, and differentiating with respect to time, the rotational speed can be calculated. The peak fundamental component rotates in the direction of increasing $\phi$ with angular speed $\omega$, the fifth harmonic rotates in the direction of decreasing $\phi$ at $\frac{1}{5}$ the speed of the fundamental component, and the seventh harmonic rotates at the same direction as the fundamental with $\frac{1}{7}$ of its speed. The fifth harmonic thus produces a negative sequence component of flux that produces negative or braking torque. The seventh produces positive torque but it is only useful between 0 and $\frac{1}{7}$ of the synchronous speed.

If a neutral connection is provided to the windings, zero sequence current components can flow in the machine. Considering a zero sequence current $I_0$, the mmf due to this current can be calculated to be:

$$F_0 = \left(\frac{4}{\pi}\right)(2N_s)\left(\frac{1}{3}\sin(3\phi) + \frac{1}{9}\sin(9\phi) + \ldots\right)I_0 \quad (6)$$

where the triple harmonic of the square wave winding functions is clearly represented. This suggests the use of triples of the fundamental current frequency to produce torque corresponding to the zero sequence winding functions. Since most conventional machines have a discrete distributed winding, the zero sequence winding function is non-zero and can be explored to produce extra torque. Injecting a third harmonic current component $I_0 = I_3 \sin(3\theta)$ and neglecting higher harmonics, the mmf is:

$$F_0 = \left(\frac{4}{\pi}\right)(2N_s)\frac{I_3}{3}(\sin(3\phi)\sin(3\theta)) \quad (7)$$

This quantity represents a standing or pulsating wave in the air gap and not a rotating wave. This component is undesirable since it produces braking and pulsating torques.

Distributing the windings over more slots can reduce the harmonic content of the mmf. For a distribution over two slots, or two slots per pole per phase, the new fundamental mmf is:

$$F_1 = \left(\frac{3}{2}\frac{4}{\pi}\right)N_sI\left[\sin(\phi - \theta) + \sin\left(\phi - \frac{\pi}{6} - \theta\right)\right] \quad (8)$$

This result corresponds to a three-phase machine with distributed windings or to a six-phase concentrated winding machine. Two three-phase winding groups, spatially phase shifted by 30 degrees, compose the six-phase machine windings.

The amplitude of the fundamental component is then:

$$|F_1| = \left(\frac{3}{2}\frac{4}{\pi}\right)2N_2I\left[\frac{\sqrt{2+\sqrt{3}}}{2}\right] = k_{d1}\left(\frac{34}{2\pi}\right)2N_sI \quad (9)$$

and the constant $k_{d1} = 0.9593$, as expected, is the usual distribution factor for two slots per pole per phase. The fundamental component is therefore reduced by 4.1% when compared to the no phase shift, full pitch case. Doing similar analysis for the fifth and seventh harmonics, it can be shown that with the distribution over two slots, the fifth harmonic component is reduced from 20% to 5% and the seventh harmonic goes from 14% to 3.7%. For this case, if a third harmonic zero sequence component is injected, it would again produce a standing wave and is of no practical value again.

If, however, two sets of three-phase currents are supplied to the two three-phase windings shifted in time with respect to each other by 30 degrees to comprise the currents in the six-phase machine, the fundamental component of the mmf can be found to be the same as in the concentrated winding machine, but now both fifth and seventh harmonics are reduced to zero. With injection of third harmonic zero sequence current components as below:

$$I_{0,abc} = I_3 \cos(3\theta) \text{ and } I_{0,xyz} = I_3 \sin(3\theta), \quad (10)$$

where ABC and XYZ correspond to the two three-phase winding groups, the zero sequence mmf is now:

$$F_0 = \left(\frac{4}{\pi}\right)\frac{N_2}{3}I_3\{\sin[3(\phi - \theta)]\} \quad (11)$$

This result corresponds to a rotating field with angular speed equal to the fundamental angular speed. Hence, the zero sequence component can now be used to produce a second positively rotating flux component synchronized with the fundamental component.

The possibility of injecting third harmonic current components into the machine without producing pulsating torques allows reshaping of the machine's flux distribution in a manner similar to the technique applied in PWM modulators. In PWM modulators, a third harmonic voltage reference is added to the fundamental component to increase the modulation index beyond the unity modulation index without distortion produced by dropping pulses. For the equivalent approach applied to the modulating machine flux, it is desired to increase the fundamental component of flux without saturating the machine.

The appropriate target reference flux waveform containing the third harmonic contribution is defined as:

$$B_g(\phi) = B_1 \sin(\phi) + B_3 \sin(3\phi) \tag{12}$$

Using an optimization process, the relation between fundamental and third harmonic components can be determined for the best iron utilization and the air gap flux is defined as a function of the maximum allowed flux distribution $B_{max}$ as:

$$B_g(\phi) = \frac{2}{\sqrt{3}} B_{max} \left[ \sin(\phi) + \frac{1}{6} \sin(3\phi) \right] \tag{13}$$

From eqn. (13), it is clear that to keep the same peak value for the flux density in the air gap with injection of the third harmonic component, the peak of the fundamental flux component is increased to a higher level than without third harmonic injection.

The benefit of using the third harmonic component can now be investigated. Using an approximate equivalent circuit for the induction machine, where the rotor leakage inductance is neglected, and assuming peak values for the variables, the rotor current is:

$$I_r = \frac{E_r s}{r'_r} \tag{14}$$

and the torque is defined by:

$$T = \frac{3 P E_r^2 s}{2 2 \omega_e r'_r} \tag{15}$$

The peak voltage $E_r$ is proportional to the peak air gap flux density and is given by:

$$E_r = \omega_e \left( \frac{2}{\pi} B_{max} \right) A_{pole} N_s \tag{16}$$

where $A_{pole}$ is the area of one magnetic pole and $N_s$ is the number of series connected turns. The factor $2/\pi$ expresses the average value of B in terms of the peak value of B.

In the case of the asymmetric six-phase machine, the maximum allowable fundamental flux density can be increased by $2/\sqrt{3}$. Since all other parameters in Eqn. (15) remain the same for this machine, the increase in torque obtained by raising the fundamental component of flux density, while keeping the same peak tooth and air gap flux density, is:

$$\frac{T_{6phase-fund}}{T_{baseline}} = \left( \frac{2}{\sqrt{3}} \right)^2 = 1.33 \tag{17}$$

where $T_{baseline}$ corresponds to the torque production in a three-phase induction machine used as baseline for the evaluation. There is thus an additional 33% in torque production for the six-phase machine with third harmonic injection due to the increase permitted in the fundamental flux. In addition to that, the third harmonic component also contributes to the total torque. The torque produced by the third harmonic currents in the six-phase machine is:

$$T = 3 \frac{P}{2} \frac{E_{r3h}^2 s_{3h}}{3 \omega_e r'_{r3h}} \tag{18}$$

and the third harmonic voltage can be computed as:

$$E_{r3h} = 3 \omega_e \left( \frac{2}{\pi} B_{max} \right) \left( \frac{A_{pole}}{3} \right) 3 \left( \frac{N_s}{3} \right) = \omega_e \left( \frac{2}{\pi} B_{max} \right) A_{pole} N_s \tag{19}$$

The slip for the third harmonic is:

$$s_{3h} = \frac{3 \omega_e - \left( \frac{3P}{2} \right) \omega_{rm}}{3 \omega_e} = \frac{\omega_e - \left( \frac{P}{2} \right) \omega_{rm}}{\omega_e} \tag{20}$$

and the rotor resistance can be determined to be:

$$r'_{r3h} = \frac{3(12) \left( \frac{N_s}{3} \right)^2}{S_r} r_{be} \tag{21}$$

where $N_s/3$ is the number of series connected turns of one of the three pairs of poles of the third harmonic, $S_r$ is the number of rotor slots, and $r_{be}$ is the resistance of a rotor bar taking into account the effect of the end ring (assuming a conventional squirrel cage rotor). The factor of 3 is used since the three pole pairs of the third harmonic are connected in series. Inserting these expressions in the torque equation (eqn. (18)) for the third harmonic:

$$T_{6phase-3h} = 3 \left( \frac{P}{2} \right) \frac{\left[ \frac{1}{3\sqrt{3}} \left( \frac{2}{\pi} B_{max} \right) A_{pole} \right]^2 \left( \omega_e - \frac{P}{2} \omega_{rm} \right)}{\frac{12}{S_r} r_{be}} \tag{22}$$

Using a similar derivation, an equivalent expression can be found for the baseline machine torque:

$$T_{baseline} = \frac{3}{2} \left( \frac{P}{2} \right) \frac{\left[ \left( \frac{2}{\pi} B_{max} \right) A_{pole} \right]^2 \left( \omega_e - \frac{P}{2} \omega_{rm} \right)}{\frac{12}{S_r} r_{be}} \tag{23}$$

Taking the ratio, the contribution of the third harmonic can be found:

$$\frac{T_{6phase-3h}}{T_{baseline}} = \frac{\left[ \frac{1}{3\sqrt{3}} \right]^2}{\frac{1}{2}} = \frac{2}{27} = 0.0741 \tag{24}$$

Thus, the contribution of the third harmonic is 7.4% of the value produced by the baseline machine. The total torque improvement is, then:

$$\frac{T_{6phase-fund} + T_{6phase-3h} - T_{baseline}}{T_{baseline}} 100\% = 40.7\% \quad (25)$$

It must be noted, however, that the peak value of stator core flux has not been maintained constant, so that the amount of improvement that can actually be realized depends upon the saturation level permitted in the stator core.

Alternatively, rather than maintain the peak air gap flux constant after addition of the third harmonic, the peak flux density could be reduced by 1.732/2 or 0.866 and the fundamental component kept constant. In this case, the slot area in the core available for copper could be increased, permitting a 14% increase in current and a 14% increase in torque for the same tooth and core flux density.

For purposes of exemplifying the invention, an asymmetric six-phase induction motor was implemented as described below using a conventional three-phase motor as a baseline. The winding distribution of the example machine is accommodated in the same frame size as the baseline three-phase motor, and both machines have similar peak air gap fluxes.

Figure 2:
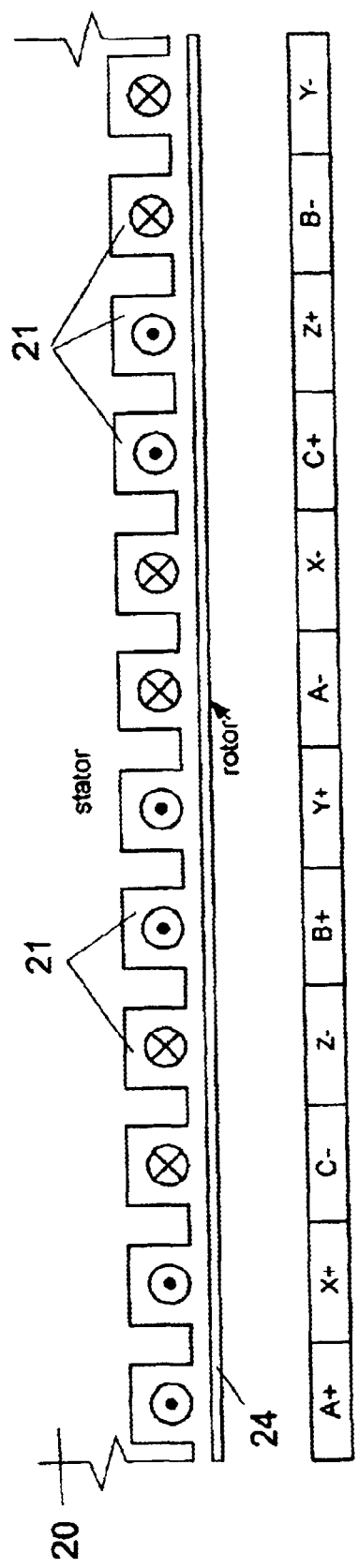
FIG. 2 illustrates a winding configuration for a machine with 30° spatial phase shift of stator windings and 30° time shift in stator fundamental currents, forming a dual three-phase or asymmetrical six-phase machine.

Proceeding from a single layer three-phase stator, a double layer six-phase distribution is implemented by dividing the three phases into two groups that are spatially shifted 30 electrical degrees. FIG. 1 illustrates windings distributed over two slots for a 30° spatially phase shifted configuration. FIG. 2 shows the 30° spatial and time shifted winding configuration. The linearized representation of the machine illustrates the stator core 20 having slots 21 in which are wound the turns of the two sets of windings ABC and XYZ. An induction machine rotor 24, preferably a conventional squirrel cage rotor (although a wound rotor may also be utilized) is mounted for rotation within the stator in a conventional manner, well known in the art. The desired phase winding currents are:

$I_a = I \cos(\omega t)$ $I_b = I \cos(\omega t - 120°)$ $I_c = I \cos(\omega t + 120°)$ $I_x = I \cos(\omega t - 30°)$ $I_y = I \cos(\omega t - 120° - 30°)$ $I_z = I \cos(\omega t + 120° - 30°)$ $I_{0,abc} = I_3 \cos(3\omega t)$ $I_{0,xyz} = I_3 \sin(3\omega t)$ The construction of the stator core 20 and the rotor 24 are conventional and well known to those of skill in the art. Conventional squirrel cage and wound rotors for induction machines may be utilized. The present invention may also be implemented in a synchronous machine with a wound rotor. The present invention may also be implemented as a linear motor having the linear stator and linear rotor configuration of FIG. 2, or the two coils ABC and XYZ may be formed on two separate linear stators on opposite sides of the linear rotor.

Figure 3:
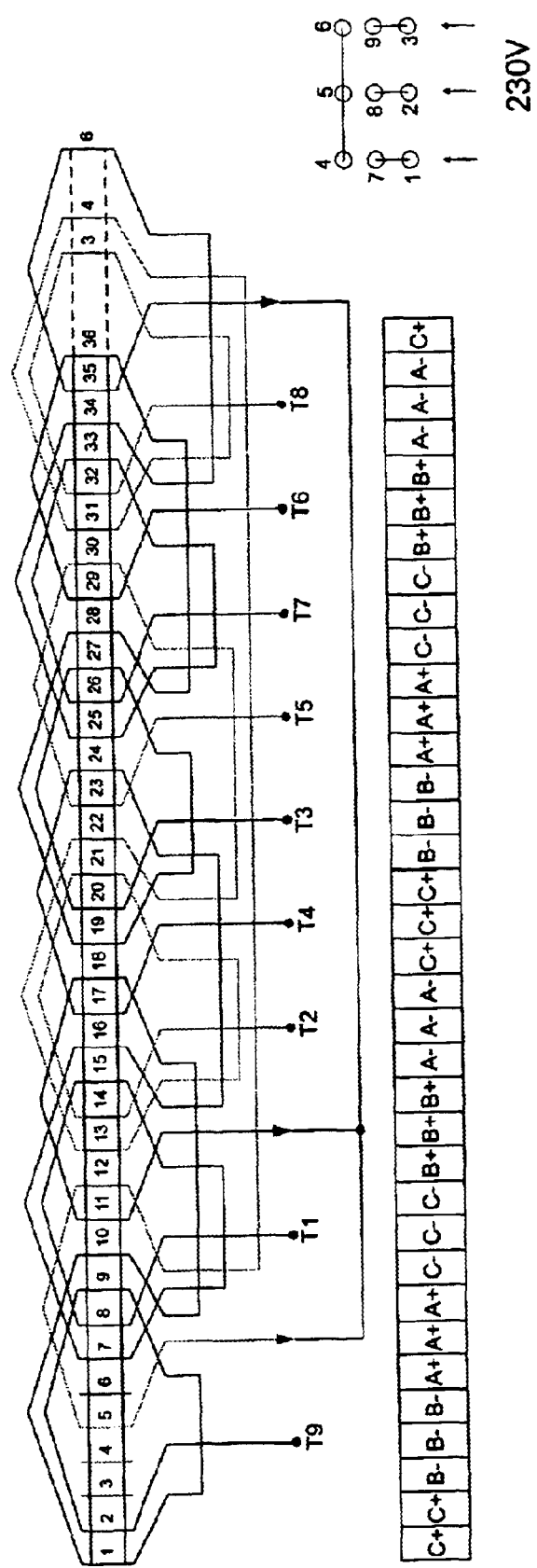
FIG. 3 is an illustrative winding diagram for a basic machine in accordance with the prior art having 36 stator slots, 28 rotor slots, concentric single layer winding, three slots per pole per phase, 98 conductors per slot, three phases.
Figure 7:
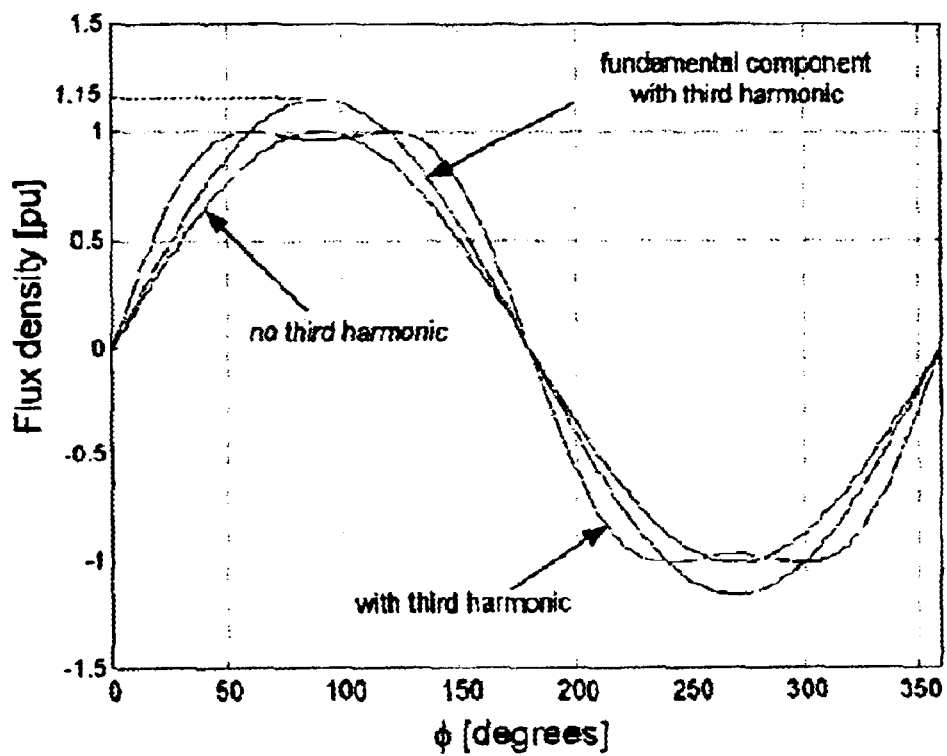
FIG. 7 are graphs illustrating machine flux density with and without third harmonic injection.

FIG. 3 shows the windings for a basic (conventional) machine in accordance with the prior art, and FIGS. 4 and 5 show the windings for the modified machine in accordance with the invention. FIG. 6 shows the winding functions for the two phases windings A and X. These diagrams illustrate the spatial phase shift between the two windings and the presence of the third harmonic component in the distribution that are necessary to interact with the injected third harmonic currents. FIG. 7 illustrates the flux density in the modified machine with and without third harmonic injection, with the fundamental component increased, as illustrated, to yield the same peak value of air gap flux.

The air gap flux may be calculated for the baseline machine of FIG. 3 from the nameplate and geometrical data. The stator phase voltage of the baseline machine is calculated as:

$$V_{sf} = \omega_e k_1 N_s \Phi_p \quad (26)$$

where $$\Phi_p = \frac{2 D_{is} l_s}{P} B_{g1} \quad (27)$$

where $D_{is}$ the stator inner diameter, $I_s$ the stator length, P the number of poles and $B_{g1}$ the peak fundamental air gap flux. The number of series connected turns per phase is defined as:

$$N_s = \frac{(\text{turns/coil})(\text{coil side/slot})(\text{number of slots})}{(\text{number of phases})(\text{circuits})} \quad (28)$$

Thus, for a single layer, three-phase machine, one has:

$$N_s = \frac{(n_s/2)(1) S_1}{3C} \quad (29)$$

For a 230V connection for an example of a commercial machine with $n_s = 98$ conductors per slot, C=4 circuits and $S_1 = 36$ stator slots, the number of series connected turns per phase $N_s = 147$. Using the machine's physical dimensions, the peak fundamental air gap flux density is calculated to be $B_{g1} = 0.53T$ when 60 Hz operation and unit winding factor are considered.

For a six-phase machine with a double layer winding, $$N_s = \frac{(n_s/4)(2) S_1}{6C} \quad (30)$$

With the same physical dimensions and the same peak fundamental air gap flux density, the flux per pole $\Phi_p$ is the same for the six-phase machine when only the fundamental component is considered. From eqn. (26) it is seen that the number of series connected turns per phase must be the same for the six-phase machine and so, to keep the same $N_s$, either $n_s$ has to be doubled or C has to be reduced by half. For this machine configuration, the reduction of C guarantees the accommodation of the conductors in the slots. Finally, the electric loading has to be checked for the new winding configuration. The electric loading for the machine is determined by:

$$K_{s\,rms} = \frac{S_1 n_s (I_s / C)}{\sqrt{2} \pi D_{is}} \quad (31)$$

With all geometrical variables in eqn. (30) held constant, the reduction in the number of circuits by half causes the stator current to reduce by half. This is reasonable since now there are two three-phase windings instead of one as in the baseline machine.

To measure the flux distribution in the air gap, a full pole pitch search coil was inserted in the machine stator, and with the aid of an operational amplifier based integrator coupled to the search coil, the flux can be determined.

Figure 8:
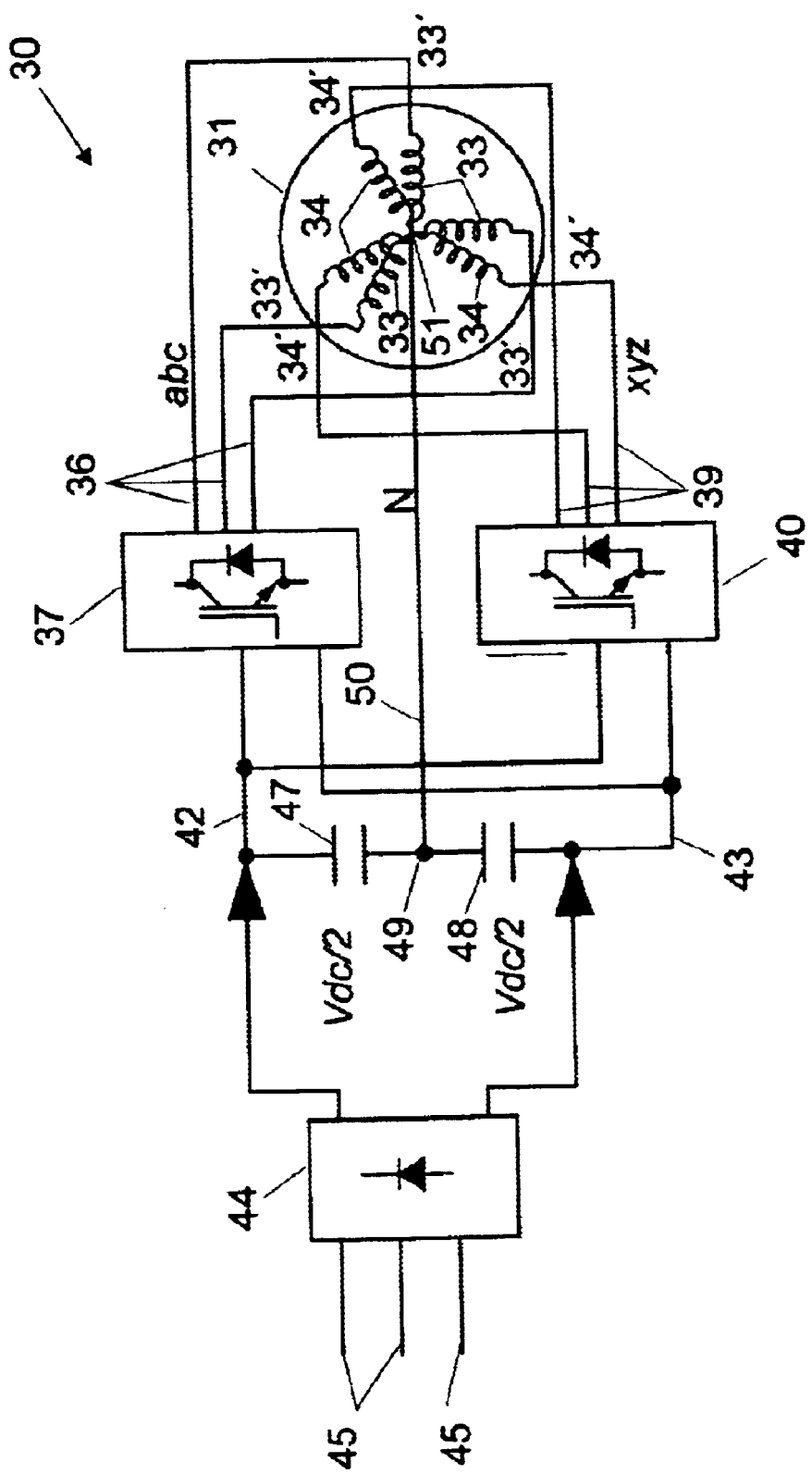
FIG. 8 is a diagram illustrating a six-phase induction motor drive system with third harmonic injection in accordance with the invention.

An exemplary motor and drive system in accordance with the invention is shown generally at 30 in FIG. 8. The system 30 includes a motor 31, constructed as described above, with a stator on which are wound turns of conductors 33 forming the first set of three-phase windings ABC and turns of conductor 34 forming the second set of three-phase windings XYZ. The two three-phase windings have three terminals 33' and 34' and neutral terminals 51 by which power may be applied to the windings. The ABC windings are supplied with power on lines 36 from a three-phase power supply 37 and the XYZ windings are supplied with power on lines 39 from a three-phase power supply 40. The power sources 37 and 40 may be, for example, solid state PWM inverters well known in the art, or any other type of power source capable of providing three-phase power at a fundamental frequency and at a third harmonic of the fundamental frequency. DC power may be provided to inverter power sources 37 and 40 from DC bus lines 42 and 43. The DC power on the bus lines may be provided from a rectifier 44 that receives power from utility lines 45. Smoothing capacitors 47 and 48 may be connected across the DC bus lines 42 and 43, with a node 49 between the capacitors 47 and 48 connected to a neutral line 50 that is connected to the neutral terminals of the ABC and XYZ windings at the junction 51. The neutral line 50 allows flow of the third harmonic currents to the node 49 between the capacitors 47 and 48. These currents form a two phase set (90° phase shift). An additional inverter (not shown) may be utilized if desired, connected in the neutral line 50 for neutral current direct control. The system of FIG. 8 may be implemented, for example, using a commercial DSP (digital signal processor) card that incorporates two independent three-phase PWM modulators with complementary outputs. Control panels for such a commercial DSP controller may be developed using HTML scripting and ActiveX commands to enable system control and monitoring over any internal or external network.

To obtain close alignment between fundamental and third harmonic currents, current regulated power supplies 37 and 40 must be used. With a voltage regulated supply, alignment is not guaranteed since the machine's impedance changes with operational conditions. Also, it is observed that with a voltage supply (no current regulation), balanced sharing of the output power between the two inverters may not be possible because of practical machine specific aspects, such as differences in the winding functions.

Figure 9:
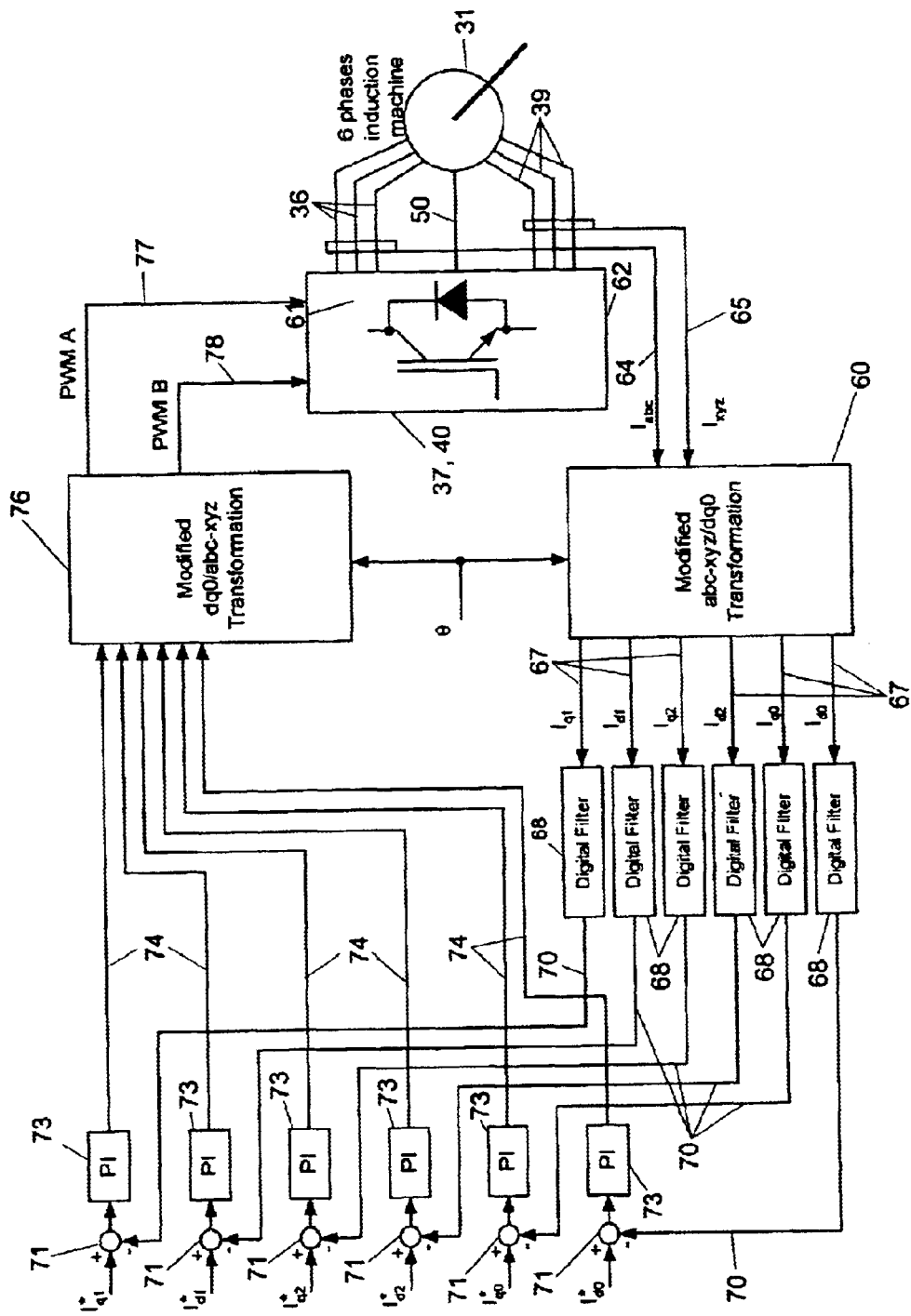
FIG. 9 is a diagram illustrating a current controller for controlling the inverters in the motor drive system of FIG. 8.

Current regulated control of the PWM inverters 37 and 40 may be implemented as shown in FIG. 9. The inverter controls may be implemented by appropriate programming of a DSP, or in discrete components, if desired. Here the cross-coupling decoupling is omitted, but for a high performance operation, it should be included. A modified abc-xyz/dq0 transformation circuit 60 is used to map the alternating drive currents, received from sensors 61 and 62 on lines 64 and 65, into dc quantities in the dq0 domain. This transformation 60 follows the standard abc/dq0 decomposition but it is modified to include the third harmonic frequency and also maps third harmonic signals into dc quantities. This approach facilitates the design of the control system. The outputs of the circuit 60 are provided on lines 67 to (e.g., digital) filters 68, the outputs of which are provided on lines 70 to summing junctions 71 that also receive the current reference values. The outputs of the summing junctions 71 are provided, e.g., to proportional-integral controllers 73, and the outputs of these are supplied on lines 74 to a dq0/abc-xyz transformation circuit 76 which reverses the decomposition to provide PWM control signals on lines 77 and 78 to the inverters 37 and 40.

A six-phase machine, of the type discussed above was constructed and tested with third harmonic current injection. The flux distribution was obtained using search coils installed in the machine and the shift torque was measured directly by means of a torque transducer.

Figure 10:
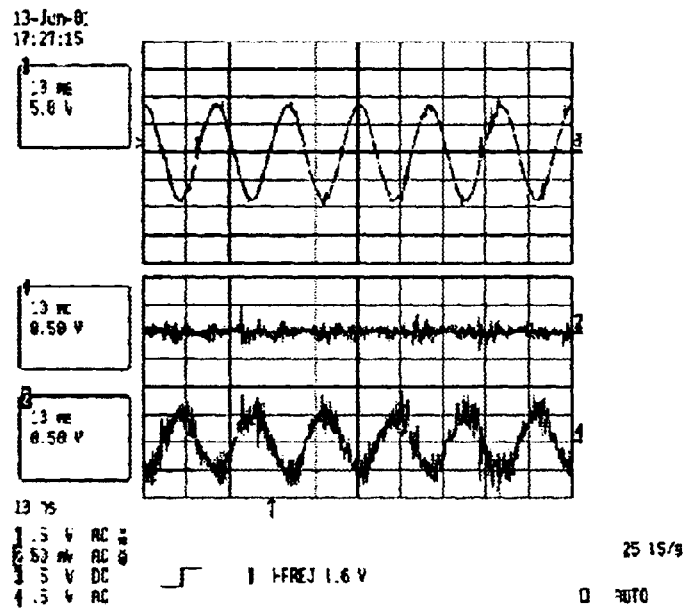
FIG. 10 are graphs illustrating flux density and current under no load operation for an exemplary six-phase machine system at $V_{11}$=230 V; trace 1 is flux density distribution (0.32T/div), trace 2 is phase A current (4.2 A/div), and trace 4 is phase X current (4.2A/div).

When supplied by a voltage source inverter, asymmetries in a practical machine design can cause uneven distribution of power between the two three-phase inverters. This can be seen in FIG. 10 where the machine is tested at rated voltage and no third harmonic injection. Phases A and X currents are shown along with the air gap flux distribution. Since phase A current is practically zero, all power is supplied through phase X. This operational condition is not desired and can be avoided by using current controlled inverters rather than voltage source inverters.

Figure 11:
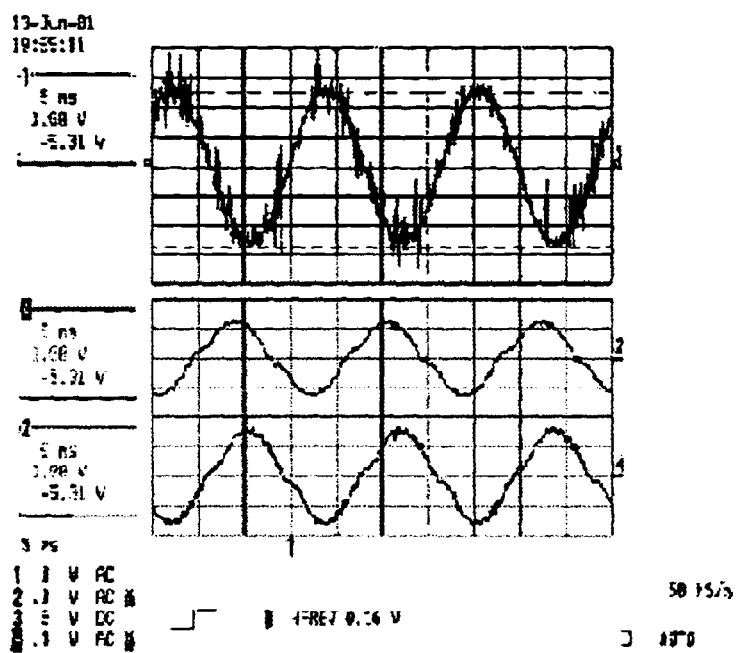
FIG. 11 are graphs illustrating flux density and current for a locked-rotor operation of the six-phase machine system at $B_{pk}$=0.17T; trace 1 is flux density distribution (0.064T/div), trace 2 is phase A current (4.2A/div), and trace 4 is phase X current (4.2A/div).
Figure 12:
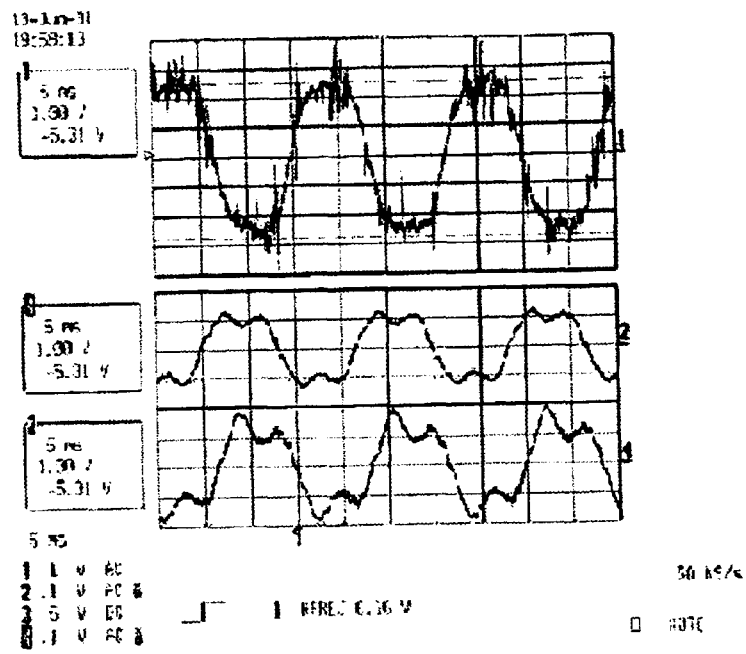
FIG. 12 are graphs illustrating flux density and current for locked-rotor operation of the six-phase machine system with third harmonic current injection and no peak flux correction, with $B_{pk}$=0.17T; trace 1 is flux density distribution (0.064T/div), trace 2 is phase A current (4.2A/div), and trace 4 is phase X current (4.2A/div).
Figure 13:
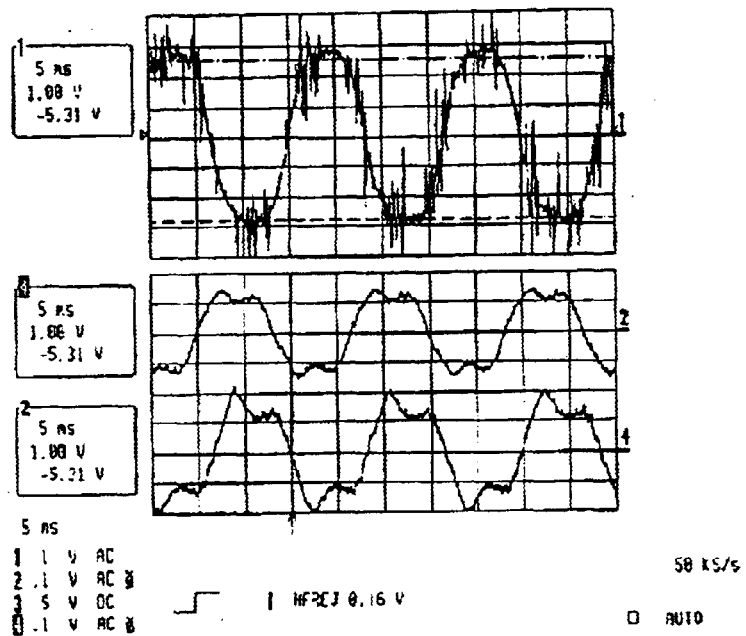
FIG. 13 are graphs illustrating flux density and current for locked-rotor operation of the six-phase machine system with third harmonic current injection and peak flux correction, at $B_{pk}$=0.17T; trace 1 is flux density distribution (0.064T/div), trace 2 is phase A current (4.2A/div), and trace 4 is phase X current (4.2A/div).
Figure 14:
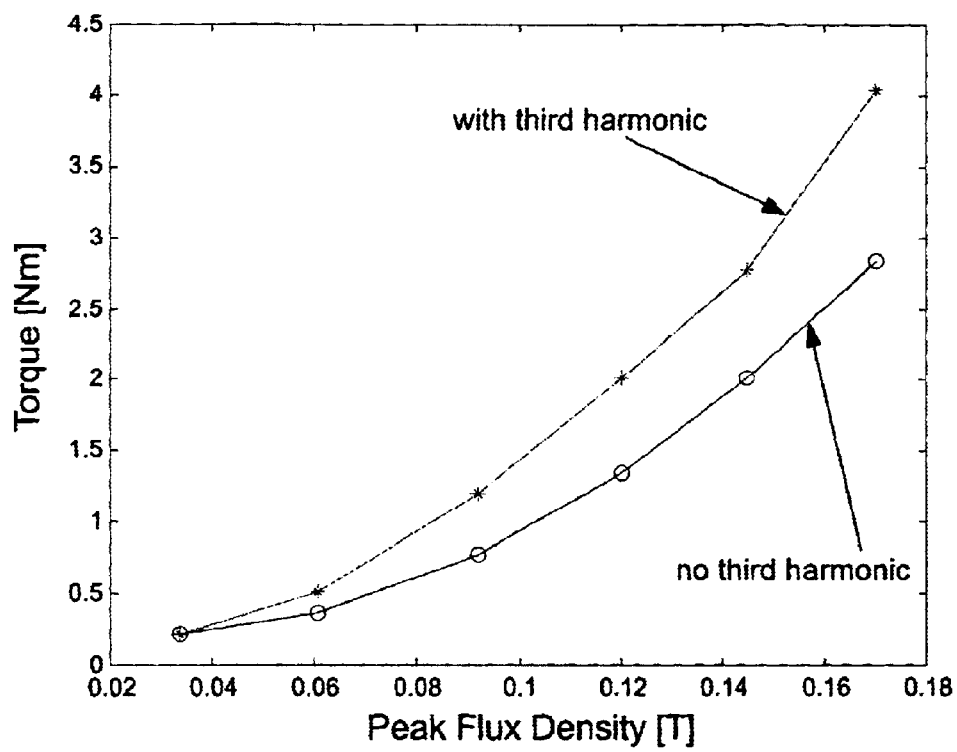
FIG. 14 are graphs illustrating torque production at locked-rotor operation for a six-phase machine with third harmonic injection (with compensation for peak air gap flux density) and without third harmonic injection.
Figure 15:
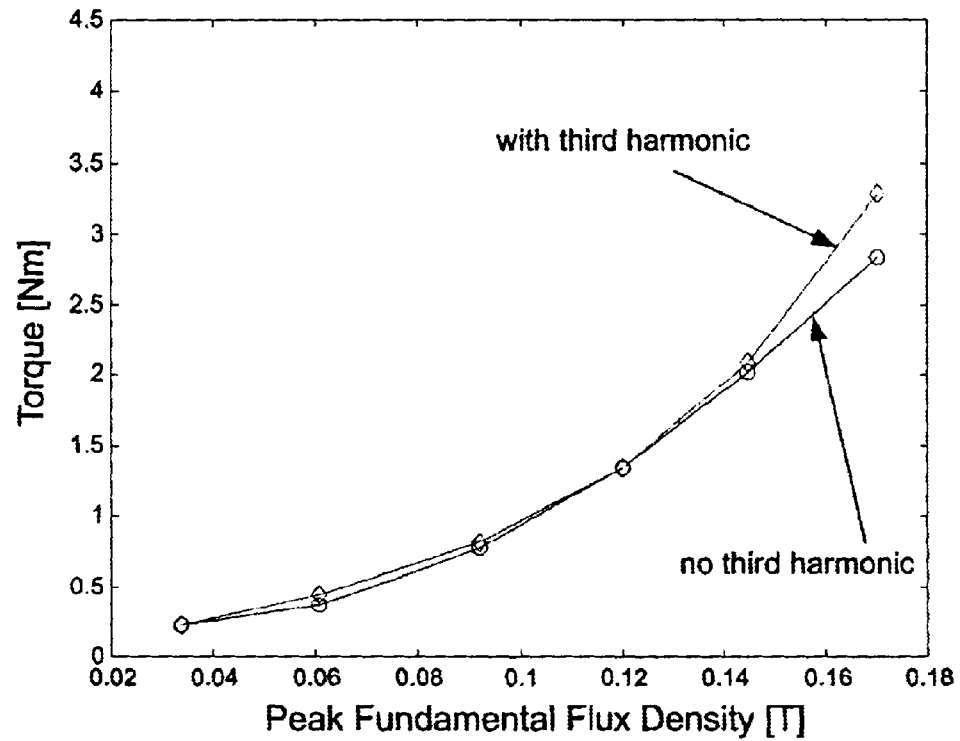
FIG. 15 are graphs illustrating torque production at locked-rotor operation for a six-phase machine with no third harmonic injection and with third harmonic injection without compensation for peak air gap flux density.

The reshaping of the air gap flux distribution was demonstrated by performing locked rotor tests on the machine still using voltage source inverters. FIG. 11 shows phases A and X currents and the flux density distribution for a peak value of $B_{pk}$=0.17T and no third harmonic injection. The currents are 30 degrees phase shifted from each other as necessary for appropriate machine operation. Some current sharing problems can be seen, but these are not as severe as in the no-load case. Without injection of the third harmonic currents, the six-phase machine operates similarly to the three-phase baseline machine. Adding third harmonic currents from the inverters causes the peak flux density to decrease, as seen in FIG. 12. This corresponds to a sub-utilization of the iron of the machine core. To raise the peak flux, the fundamental current can be increased until the baseline level of flux is reached. This result is shown in FIG. 13, where the peak flux correction is applied and the peak flux is at the same level as for the core with no third harmonic currents. FIG. 14 shows the torque measurements as a function of the peak air gap flux density for two cases: no third harmonic injection and third harmonic injection with peak flux correction. It is clear that an improvement in the torque production exists due to the increase in the fundamental current while keeping the peak flux level within its prior limits. The results shown in FIG. 14 demonstrate that the torque improvement is caused by two factors. First, a large contribution in added torque results from the increase permitted in the fundamental air gap flux. Second, additional torque is due to the rotating field created by the zero sequence third harmonic currents. FIG. 15 shows the contribution from this second factor. Here, the fundamental peak air gap flux is kept constant and third harmonic currents are injected. The peak air gap flux decreases and is not corrected. From this figure, one can observe the amount of the increase in the torque production due to the third harmonic injection.

Figure 16:
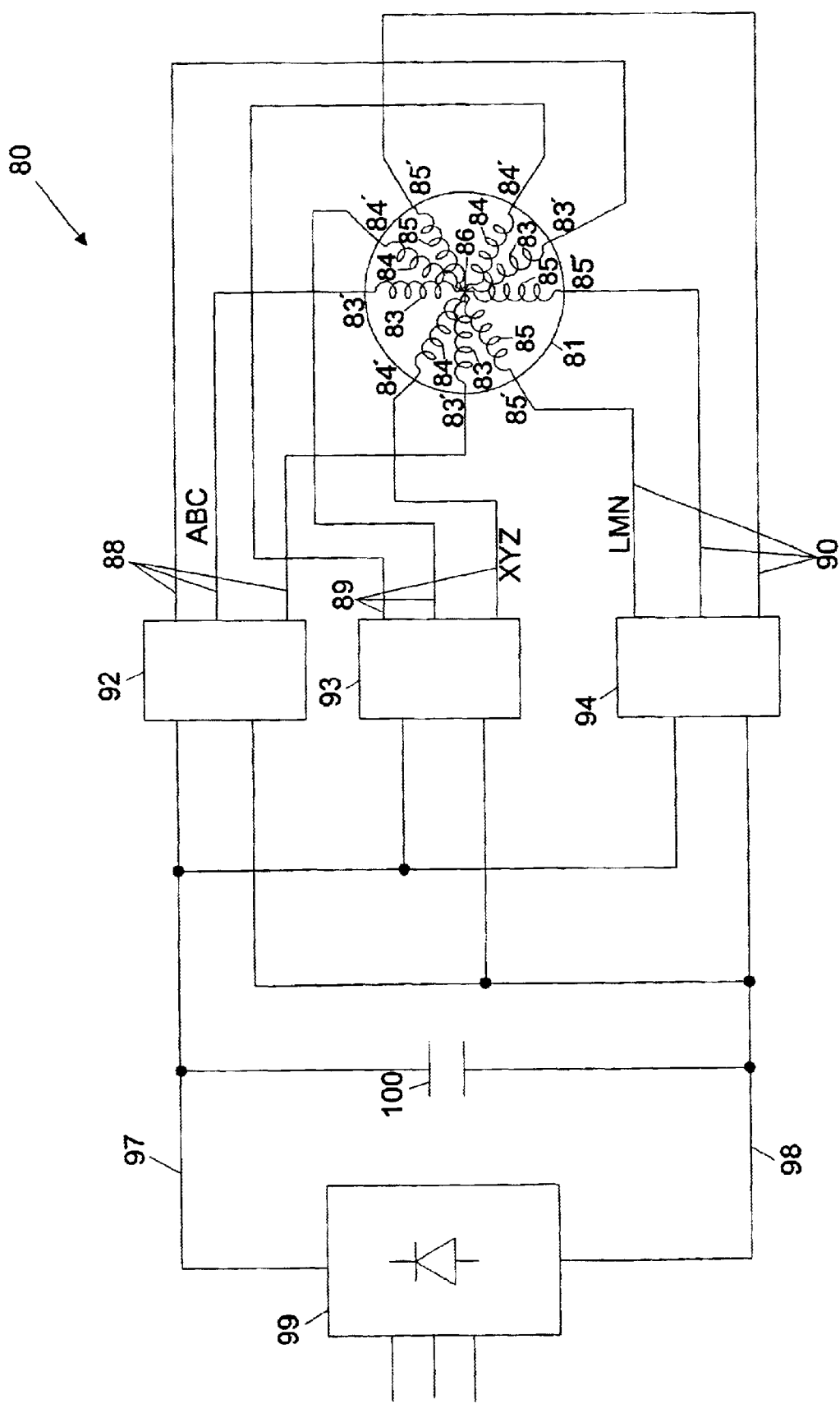
FIG. 16 is a diagram illustrating a nine-phase induction motor drive system with third harmonic injection in accordance with the invention.

The present invention can be extended to machines having multiples of three phases. An example of a nine-phase motor and drive system is shown at 80 in FIG. 16. The system 80 has a motor 81 with a core and a rotor formed in a conventional manner. The motor has three sets of windings 83, 84 and 85 forming three-phase windings ABC, XYZ and LMN. Power is supplied to the three terminals 83', 84' and 85' and a neutral terminal junction 86 of the windings 83, 84, and 85, respectively, on lines 88, 89 and 90. A first power supply 92 provides power on the lines 88 to the ABC phase windings, a second power supply 93 provides power on the lines 89 to the XYZ phase windings, and a third power supply 94 supplies power on the lines 90 to the LMN phase windings. The power supplies 92, 93 and 94 may be three-phase PWM inverters that receive DC power from DC bus lines 97 and 98. The DC voltage on the bus lines 97 and 98 may be provided from a rectifier 99, with a capacitor 100 connected across the bus lines to provide smoothing of the output voltage from the rectifier. The three-phase groups ABC, XYZ and LMN on the rotor 81 are phase shifted with respect to each other by 20 electrical degrees (60°/3) rather than 30 degrees (60°/2) as is the case for the six-phase machine discussed above. The three power supplies provide current shifted in time by 20° with respect to the fundamental, i.e., the second power supply provides current shifted by 20° and the third power supply provides current shifted by 40° with respect to the current provided by the first power supply. Third harmonic currents may be provided by the power supplies 92, 93 and 94 to each of the three-phase groups in the form $I_3^*\sin\theta$, $I_3^*\sin(\theta-120°)$, and $I_3^*\sin(\theta-240°)$, i.e., a three-phase set of third harmonics. In this case, the three third harmonic currents form a balanced set and sum to zero, and neutral return lines are not needed. If desired, the power supplies 92, 93 and 94 may also provide a ninth harmonic component, which allows the fundamental component to be raised somewhat and makes the air gap flux wave even flatter.

It is understood that the invention is not confined to the embodiments set forth herein as illustrative, but embraces all such forms thereof as come within the scope of the following claims.

What is claimed is:

1. A motor drive system comprising:
   (a) an electrical motor having a stator with a core, two three-phase stator windings wound on the core, the two three-phase windings separated spatially by 30 electrical degrees, each of the two three-phase windings having three terminals and a neutral terminal by which power may be applied to the three-phase windings, and a rotor within the stator; and
   (b) a first power supply connected to the terminals of a first of the stator three-phase windings and a second power supply connected to the terminals of a second of the stator three-phase windings, the power supplies formed to supply current to the two three-phase windings with the same fundamental frequency and with an additional zero sequence component at the third harmonic of the fundamental frequency, with one of the power supplies providing current to a one of the three-phase windings that is shifted in time by 30° of the fundamental frequency current with respect to the current provided by the other power supply.

2. The motor drive system of claim 1 wherein the power supplies are inverters that receive DC power on DC bus lines.

3. The motor drive system of claim 2 including a rectifier connected to rectify AC power to DC voltage supplied to the DC bus lines, a pair of smoothing capacitors connected together at a node and connected across the DC bus lines, wherein the neutral terminals of the three-phase windings are connected to the node between the capacitors.

4. The motor drive system of claim 2 wherein the inverters are current controlled pulse-width modulated inverters that deliver balanced power to the two three-phase windings.

5. The motor drive system of claim 4 including a controller connected to control the inverters, the controller including an ABC-XYZ/dq0 transformation that includes the third harmonics.

6. A method of controlling an electrical motor having a stator with a core, two three-phase windings wound on the core, the two three-phase windings separated spatially by 30 electrical degrees, each of the two three-phase windings having three terminals and a neutral terminal by which power may be applied to the three-phase windings, and a rotor within the stator, comprising the steps of:
   (a) applying current at a fundamental frequency and zero sequence current at a third harmonic of the fundamental frequency to the terminals of a first of the two three-phase windings; and
   (b) applying current at the same fundamental frequency and zero sequence current at the same third harmonic frequency to the terminals of a second of the two three-phase windings but shifted in time by 30° of the fundamental frequency current with respect to the current provided to the first of the three-phase windings.

7. The method of claim 6 wherein the steps of applying current are carried out to provide current controlled balanced power to the two three-phase windings.

8. A linear motor drive system comprising:
   (a) a linear induction motor having a stator with at least one core, two three-phase windings wound on the core, the two three-phase windings separated spatially by 30 electrical degrees, each of the two three-phase windings having three terminals and a neutral terminal by which power may be applied to the windings, and an induction machine linear rotor; and
   (b) a first power supply connected to the terminals of a first of the stator three-phase windings and a second power supply connected to the terminals of a second of the stator three-phase windings, the power supplies formed to provide current to the two three-phase windings with the same fundamental frequency and with an additional zero sequence component at the third harmonic of the fundamental frequency with one of the power supplies providing current to one of the three-phase windings that is shifted in time by 30° of the fundamental frequency current with respect to the current provided by the other power supply.

9. The motor drive system of claim 8 wherein the stator core has a plurality of slots, wherein the two three-phase windings are wound together in the slots with one of the three-phase windings spatially displaced from the other three-phase winding by one slot.

10. The motor drive system of claim 8 wherein the power supplies are inverters that receive DC power on DC bus lines.

11. The motor drive system of claim 10 including a rectifier connected to rectify AC power to DC voltage supplied to the DC bus lines, a pair of smoothing capacitors connected together at a node and connected across the DC bus lines, wherein the neutral terminals of the three-phase windings are connected to the node between the capacitors.

12. The motor drive system of claim 10 wherein the inverters are current controlled pulse-width modulated inverters that deliver balanced power to the two three-phase windings.

13. The motor drive system of claim 12 including a controller connected to control the inverters, the controller including an ABC-XYZ/dq0 transformation that includes the third harmonics.

14. A method of controlling a linear induction motor having a stator with at least one core, two three-phase windings wound on the core, the two windings separated spatially by 30 electrical degrees, each of the two three-phase windings having three terminals and a neutral terminal by which power may be applied to the three-phase windings, and an induction machine linear rotor, comprising the steps of:

(a) applying current at a fundamental frequency and a zero sequence current at a third harmonic of the fundamental frequency to the terminals of a first of the two three-phase windings; and (b) applying current at the same fundamental frequency and zero sequence current at the same third harmonic frequency to the terminals of a second of the two three-phase windings but shifted in time by 30° of the fundamental frequency current with respect to the current provided to the first of the three phase windings.

15. The method of claim 14 wherein the steps of applying current are carried out to provide current controlled balanced power to the two three-phase windings.

16. A motor drive system comprising:

(a) an induction motor having a stator with a core, two three-phase stator windings wound on the core, the two three-phase windings separated spatially by 30 electrical degrees, each of the two three-phase windings having three terminals and a neutral terminal by which power may be applied to the three-phase windings, and an induction machine rotor within the stator; and (b) a first power supply connected to the terminals of a first of the stator three-phase windings and a second power supply connected to the terminals of a second of the stator three-phase windings, the power supplies formed to supply current to the two three-phase windings with the same fundamental frequency and with an additional zero sequence component at the third harmonic of the fundamental frequency, with one of the power supplies providing current to a one of the three-phase windings that is shifted in time by 30° of the fundamental frequency current with respect to the current provided by the other power supply.

17. The motor drive system of claim 16 wherein the rotor is a squirrel cage rotor.

18. The motor drive of claim 16 wherein the core has a plurality of slots, wherein the two three-phase windings are wound together in the slots with one of the three-phase windings spatially displaced from the other three-phase winding by one slot.

19. The motor drive system of claim 16 wherein the power supplies are inverters that receive DC power on DC bus lines.

20. The motor drive system of claim 19 including a rectifier connected to rectify AC power to DC voltage supplied to the DC bus lines, a pair of smoothing capacitors connected together at a node and connected across the DC bus lines, wherein the neutral terminals of the three-phase windings are connected to the node between the capacitors.

21. The motor drive system of claim 19 wherein the inverters are current controlled pulse-width modulated inverters that deliver balanced power to the two three-phase windings.

22. The motor drive system of claim 21 including a controller connected to control the inverters, the controller including an ABC-XYZ/dq0 transformation that includes the third harmonics.

23. A method of controlling an electrical motor having a stator with a core, two three-phase windings wound on the core, the two three-phase windings separated spatially by 30 electrical degrees, each of the two three-phase windings having three terminals and a neutral terminal by which power may be applied to the three-phase windings, and an induction machine rotor within the stator, comprising the steps of:

(a) applying current at a fundamental frequency and zero sequence current at a third harmonic of the fundamental frequency to the terminals of a first of the two three-phase windings; and (b) applying current at the same fundamental frequency and zero sequence current at the same third harmonic frequency to the terminals of a second of the two three-phase windings but shifted in time by 30° of the fundamental frequency current with respect to the current provided to the first of the three-phase windings.

24. The method of claim 23 wherein the steps of applying current are carried out to provide current controlled balanced power to the two three-phase windings.

25. A motor drive system comprising:

(a) an induction motor having a stator with a core, three three-phase stator windings wound on the core, a second and third of the three-phase windings separated spatially by 20 and 40 electrical degrees, respectively, from a first of the three-phase windings, each of the three three-phase windings having three terminals by which power may be applied to the three-phase windings, and an induction machine rotor within the stator; and (b) a first power supply connected to the terminals of a first of the stator three-phase windings, a second power supply connected to the terminals of a second of the stator three-phase windings, and a third power supply connected to the terminals of a third of the stator three-phase windings, the power supplies formed to supply current to the three three-phase windings with the same fundamental frequency and with an additional component at the third harmonic of the fundamental frequency, the second power supply providing current that is shifted in time by 20° of the fundamental frequency current and the third power supply providing current that is shifted in time by 40° of the fundamental frequency current with respect to the current provided by the first power supply.

26. The motor drive system of claim 25 wherein the rotor is a squirrel cage rotor.

27. The motor drive system of claim 25 wherein the power supplies are inverters that receive DC power on DC bus lines.

28. The motor drive system of claim 27 wherein the inverters are current controlled pulse-width modulated inverters that deliver balanced power to the three three-phase windings.

29. The motor drive system of claim 28 including a controller connected to control the inverters, the controllers including an ABC-XYZ/dq0 transformation that includes the third harmonics.

30. A method of controlling an induction motor having a stator with a core, three three-phase windings would on the core, a second and third of the three-phase windings separated spatially by 20 and 40 electrical degrees, respectively, from a first of the three-phase windings, each of the three-phase windings having three terminals by which power may be applied to the three-phase windings, and an induction machine rotor within the stator, comprising the steps of:

(a) applying current at a fundamental frequency and current at a third harmonic of the fundamental frequency to the terminals of a first of the two three-phase windings;

(b) applying current at the same fundamental frequency and current at the same third harmonic frequency to the terminals of a second of the two three-phase windings but shifted in time by 20° of the fundamental frequency current with respect to the current provided to the first of the three-phase windings; and (c) applying current at a fundamental frequency and current at the same third harmonic frequency to a third of the three-phase windings but shifted in time by 40° of the fundamental frequency.

31. The method of claim 30 wherein the steps of applying current are carried out to provide current controlled balanced power to the three three-phase windings.

32. A power supply system for an induction motor having two three-phase stator windings with three terminals and a neutral terminal by which power may be applied to the three-phase windings comprising:

a first power supply connectable to the terminals of a first of the three-phase windings and a second power supply connectable to the terminals of a second of the three-phase windings, the power supplies formed to supply current with the same fundamental frequency and with an additional zero sequence component at the third harmonic of the fundamental frequency, with one of the power supplies providing current that is shifted in time by 30° of the fundamental frequency current with respect to the current provided by the other power supply, wherein the power supplies are inverters that receive DC power on DC bus lines, and a rectifier connected to rectify AC power to DC voltage supplied to the DC bus lines, a pair of smoothing capacitors connected together at a node and connected across the DC bus lines, wherein the neutral terminals of the three-phase windings are connectable to the node between the capacitors.

33. The power supply system of claim 32 wherein the inverters are current controlled pulse-width modulated inverters that deliver balanced power to the two three-phase windings.

34. The power supply system of claim 33 including a controller connected to control the inverters, the controller including an ABC-XYZ/dq0 transformation that includes the third harmonics.

* * * * *

UNITED STATES PATENT AND TRADEMARK OFFICE
CERTIFICATE OF CORRECTION

PATENT NO.    : 6,710,495 B2
DATED         : March 23, 2004
INVENTOR(S)   : Thomas A. Lipo and Renato O.C. Lyra It is certified that error appears in the above-identified patent and that said Letters Patent is hereby corrected as shown below:

Column 16,
Line 53, delete the phrase "three-phase windings would on the" and replace it with
-- three-phase windings wound on the --.

Signed and Sealed this

Twenty-first Day of December, 2004

JON W. DUDAS
*Director of the United States Patent and Trademark Office*